United States Patent [19]

Dumolo

[11] 4,224,201
[45] Sep. 23, 1980

[54] FOUNDRY BINDERS
[75] Inventor: David Dumolo, Dudley, England
[73] Assignee: Fordath Limited
[21] Appl. No.: 971,128
[22] Filed: Dec. 19, 1978

Related U.S. Application Data

[63] Continuation-in-part of Ser. No. 836,924, Sep. 26, 1977.

[30] Foreign Application Priority Data

Jul. 21, 1977 [GB] United Kingdom ............... 30608/77

[51] Int. Cl.² .......................... B22C 1/22; B22C 1/24; C08L 91/00
[52] U.S. Cl. ................................. 260/18 TN; 164/43; 260/37 N; 260/38
[58] Field of Search ................. 260/37 N, 18 TN, 38, 260/DIG. 40; 164/43

[56] References Cited

U.S. PATENT DOCUMENTS

| | | | |
|---|---|---|---|
| 3,255,500 | 6/1966 | Engel et al. | 260/40 R |
| 3,403,721 | 10/1968 | Robins et al. | 260/DIG. 40 |
| 3,409,579 | 11/1968 | Robins | 260/30.4 |
| 3,428,110 | 2/1969 | Walker et al. | 260/DIG. 40 |
| 3,429,848 | 2/1969 | Robins | 260/38 |
| 3,432,457 | 3/1969 | Robins | 260/30.4 |
| 3,933,727 | 1/1976 | Schmid | 260/DIG. 40 |

*Primary Examiner*—Sandra M. Person
*Attorney, Agent, or Firm*—Sughrue, Rothwell, Mion, Zinn and Macpeak

[57] ABSTRACT

In a foundry binder comprising a polyisocyanate and a polyhydroxy composition, the polyisocyanate is modified by reaction with a drying oil. The composition is useful in a "cold box" process.

10 Claims, No Drawings

FOUNDRY BINDERS

RELATED APPLICATION

This application is a continuation-in-part of application Ser. No. 836,924 filed Sept. 26, 1977.

BACKGROUND TO THE INVENTION

This invention relates to a foundry composition from which foundry moulds or cores are to be formed and to a method of producing a foundry mould or core.

In U.S. Pat. No. 3,925,296, there is disclosed a foundry binder comprising a polyfunctional phenol and a polyisocyanate. The binder is used by mixing the phenol and the isocyanate with foundry sand and then passing an amine catalyst in gaseous form through the mixture to cause the phenol and the isocyanate to react together and bind the sand.

One object of the present invention is to improve the binder disclosed in the aforementioned patent so that a smaller proportion of the improved binder is required to achieve a given core strength. The reduction of the amount of binder used without any consequent loss in core strength has a number of advantages which are well known. A further object of the invention is the provision of a binder which is less expensive to use than are known binders which produce cores having similar properties.

SUMMARY OF THE INVENTION

In a method of producing a foundry mould or core wherein there is mixed with a foundry aggregate a polyisocyanate and a polyhydroxy composition which reacts with the polyisocyanate to bind the aggregate, the invention provides the improvement wherein, prior to mixing of the polyisocyanate with the aggregate, the polyisocyanate is modified by reaction with a drying oil.

I have discovered that the weight of polyisocyanate and/or the weight of polyhydroxy compound reacted therewith which is necessary to produce a core of given size and strength can be reduced by modification of the polyisocyanate with a drying oil. This enables a corresponding reduction in the cost of manufacturing the core.

According to the invention there is also provided a foundry composition from which a core or mould is to be formed, the composition comprising a polyisocyanate composition and a polyhydroxy composition and the polyisocyanate composition comprising the product of a reaction between a polyisocyanate and a drying oil.

DESCRIPTION OF PREFERRED EMBODIMENTS

A polyioscyanate was modified by reacting the polyisocyanate with a drying oil in the following manner. A mixture of the polyisocyanate and drying oil was heated to a temperature of approximately 145° C. for approximately fifteen minutes. The mixture was then cooled and a solvent added. The amounts used were such that the proportions, by weight, in the modified polyisocyanate solution were as follows:

Polyisocyanate: 67.5%
Raw linseed oil: 22.5%
Solvent: 10%

The polyisocyanate used was a commercially available mixture of isocyanates, primarily polymethylenebisphenyldiisocyanate. The drying oil was a raw linseed oil supplied by British Oil and Cakemills Limited, England. The solvent was sold by British Petroleum Limited, England under the designation A260.

Four polyhydroxy compositions were prepared as follows:

| Polyhydroxy composition 1 | Bisphenol A | 50% |
|---|---|---|
| | Oxitol acetate | 50% |
| Polyhydroxy composition 2 | Bisphenol A | 50% |
| | Oxitol acetate | 47% |
| | Polyether polyol | 3% |
| Polyhydroxy composition 3 | Phenolic resin | 50% |
| | Oxitol acetate | 50% |
| Polyhydroxy composition 4 | Polyether polyol | 70% |
| | Oxitol Acetate | 30% |

By a phenolic resin, we mean herein a polymeric condensation product obtained by the reaction of a phenol with an aldehyde. Resole resins may be used, although the preferred resins are Novolak resins. Suitable phenolic resins and suitable phenols and aldehydes for the preparation of suitable resins are disclosed in British Pat. No. 1,190,644.

Sand cores were prepared using polyhydroxy compositions 1 through 4 in admixture firstly with the unmodified polyisocyanate and secondly the modified polyisocyanate, by the following method. To 2.5 kg Chelford 50 AFS sand in a sand muller there was added a known quantity of the polyhydroxy composition. The contents of the muller were thoroughly mixed for one minute and then a known quantity of the polyisocyanate was added to the mixture in the muller and mixing was continued for one further minute. The mixture thus prepared was blown by compressed air into the cavity of a flexural bar mould, this cavity measuring 8"×1"×1". A manifold was clamped to the open end of the bar mould and the vapour of an amine catalyst was passed through the mixture in the mould. After gassing of the mixture with the catalyst, the core was purged by passing dry compressed air through the mould for ten seconds to carry residual catalyst away from the core.

The catalyst used was dimethylethylamine in admixture with carbon dioxide, the mixture comprising 10% by weight of the amine. With each binder, the time for which the catalyst was passed into the mould varied during different tests to establish the minimum gassing time required to achieve 25 seconds after the beginning of the gassing/purging cycle a core having sufficient strength to he handled without significant damage. The minimum gassing time for each binder is stated in the Table of results which appears hereinafter.

Four cores were prepared from each binder combination by passing the catalyst through the moulded mixture for the minimum gassing time. Of these four cores, one was removed from the mould immediately the gassing/purging cycle was completed and the flexural strength of the core was measured as quickly as possible. The remaining cores were also removed from the mould but stored at constant temperature (20° C.) and constant humidity (50% R.H.) for periods of five minutes, one hour and twenty four hours respectively before the flexural strength was measured. The measured flexural strengths are stated in the Table of results appearing hereinafter.

The Table of results also states the proportion of polyhydroxy composition and the proportion of polyisocyanate used in each binder combination are stated in the Table. These proportions are considered to be the optimum proportions for each binder combination. The optimum proportions have been determined by carrying out a series of tests not recorded in the Table.

The unmodified polyisocyanate used was diluted with a mixture of hydrocarbon solvents sold by British Petroleum Limited, England under the designation A260. A mixture containing 67.5% of the polyisocyanate and 32.5% of this solvent was used in the proportions indicated in the Table.

| Hydroxy Component | | Isocyanate | | | | | | |
|---|---|---|---|---|---|---|---|---|
| Number | Weight as proportion of weight of sand. | Kind | Weight as proportion of weight of sand. | Gassing Time (sec) | Flexural strength in lb/in² | | | |
| | | | | | Immediate | 5 min | 1 hr | 24 hrs |
| 1 | 0.5% | unmod. | 1% | 2.0 | 360 | 400 | 280 | 110 |
|   |      | modified | 1% | 1.0 | 420 | 440 | 320 | 120 |
| 2 | 0.5% | unmod. | 1% | 2.5 | 300 | 400 | 420 | 300 |
|   |      | modified | 1% | 1.2 | 420 | 440 | 440 | 400 |
| 3 | 0.75% | unmod. | 0.75% | 0.8 | 360 | 400 | 440 | 420 |
|   |      | modified | 0.75% | 0.8 | 350 | 380 | 440 | 425 |
| 4 | 0.75% | unmod. | 0.75% | 20.0 | 80 | 120 | 140 | 150 |
|   |      | modified | 0.75% | 15.0 | 100 | 150 | 160 | 130 |

From the tabulated results, it is clear that modification of the polyisocyanate results in a material which is no less effective as a coreactant for the polyhydroxy compositions to bind the particles of sand than is the unmodified polyisocyanate. In cases where the polyisocyanate is more expensive than the drying oil, a saving in cost of the binder can be achieved.

With polyhydroxy compositions 1, 2 and 4 the cores acquire strength after gassing more quickly when the modified isocyanate is used than when the unmodified isocyanate is used. With polyhydroxy compositions 1 and 2, the minimum gassing times when the modified polyisocyanate is used are approximately half the minimum gassing times when the unmodified polyisocyanate is used. Polyhydroxy compositions 1 and 2 comprise bisphenol A and it appears that the improvement resulting from use of the modified isocyanate is particularly significant when the phenol is present in the binder.

I claim:

1. In a method of producing a foundry mould or core wherein there is mixed with a foundry aggregate a polyisocyanate and a polyhydroxy composition which reacts with the polyisocyanate to bind the aggregate, the improvement wherein, prior to mixing of the polyisocyanate with the aggregate, the polyisocyanate is modified by reaction with a drying oil.

2. The improvement according to claim 1 wherein the polyisocyanate is modified by heating with about one third of its weight of drying oil.

3. In a foundry composition from which a foundry mould or core is to be produced, the composition comprising a polyisocyanate composition and a polyhydroxy composition, the improvement wherein the polyisocyanate composition comprises the product of a reaction between a polyisocyanate and a drying oil.

4. The improvement according to claim 3 wherein the polyhydroxy composition comprises an aromatic polyhydroxy compound.

5. The improvement according to claim 4 wherein the aromatic polyhydroxy compound is bisphenol A.

6. The improvement according to claim 4 wherein the aromatic polyhydroxy compound is a phenolic resin.

7. The improvement according to claim 3 wherein the polyhydroxy composition comprises an aliphatic polyhydroxy compound.

8. The improvement according to claim 3 wherein the polyhydroxy composition comprises both an aliphatic polyhydroxy compound and an aromatic polyhydroxy compound.

9. The improvement according to claim 1, wherein said reaction with a drying oil occurs at approximately 145° C.

10. The improvement according to claim 1, wherein said reaction with a drying oil is by heating said drying oil and said polyisocyanate.

* * * * *